United States Patent [19]

Bolger, Jr.

[11] 4,007,817

[45] Feb. 15, 1977

[54] ROADWAY FOR SUPPLYING POWER TO VEHICLES AND METHOD OF USING THE SAME

[76] Inventor: John G. Bolger, Jr., 460 Tahos Road, Orinda, Calif. 94563

[22] Filed: Jan. 9, 1974

[21] Appl. No.: 431,924

Related U.S. Application Data

[63] Continuation of Ser. No. 345,332, March 27, 1973, abandoned, which is a continuation of Ser. No. 146,213, May 24, 1971, abandoned.

[52] U.S. Cl. .................................. 191/10; 191/14
[51] Int. Cl.² ................................. B60J 9/00
[58] Field of Search ............. 191/2 R, 10, 14; 310/12–14; 104/148 LM; 336/115, 129, 130

[56] References Cited

UNITED STATES PATENTS 458,859   9/1891   Ries .................................. 191/10
859,018   7/1907   Smith .......................... 104/148 LM

FOREIGN PATENTS OR APPLICATIONS 12,241   6/1895   United Kingdom ................ 191/10

*Primary Examiner*—Stanley H. Tollberg
*Attorney, Agent, or Firm*—Colton & Stone, Inc.

[57] ABSTRACT

A roadway having at least one lane for traffic moving in one direction and at least one lane for traffic moving in the opposite direction is provided with power conductors for inductively coupling power to vehicles moving along the roadway. The conductors are embedded in the lanes and extend in the direction of vehicular movement. Power sources are provided along the roadway and the conductors are arranged so as to minimize the lengths thereof which are not directly employed for the inductive coupling of power to vehicles.

8 Claims, 4 Drawing Figures

INVENTOR
JOHN G. BOLGER

BY

ROADWAY FOR SUPPLYING POWER TO VEHICLES AND METHOD OF USING THE SAME

CROSS-REFERENCE TO RELATED APPLICATIONS

This application is a continuation of application Ser. No. 345,332 filed Mar. 27, 1973 and now abandoned, which is, in turn, a continuation of application Ser. No. 146,213, filed May 24, 1971 and now abandoned.

The roadway construction of this application is particularly adapted for use in conjunction with a vehicle of the type disclosed in U.S. Pat. No. 3,914,526, granted Oct. 21, 1975 and entitled Supply Power to Vehicles.

BACKGROUND OF THE INVENTION

Because of the pollution problems caused by existing internal combustion engines, there has recently been considerable effort expended toward providing pollution free vehicular power plants. One of the alternatives suggested has been electrically driven vehicles having battery power sources. Although this approach has been used for some time for short-range special-purpose vehicles, such as golf carts and fork lift trucks, conventional batteries are not well adapted for use as the primary energy source to propel general purpose vehicles. Besides lacking sufficient ampere-hour capacity for extended use, the weight of conventional batteries seriously inhibits their use as the primary source of energy for general utility vehicles.

There is disclosed in the aforementioned application, the disclosure of which is incorporated herein by reference, an electrically driven vehicle having means for receiving power from a specially prepared roadway and batteries for driving the vehicle for travel on conventional roads. When traveling on the specially prepared roadways, sufficient energy is coupled to the vehicle to charge the battery for subsequent travel on conventional roadways.

An important factor in the acceptability of a vehicle which is driven at various times by energy coupled from a specially prepared roadway is the cost of such roadways. Using the Los Angeles Basin as an example, there are tens of thousands of miles of streets and highways presently in existence. Less than about 500 miles of the highway network in the Los Angeles Basin would have to be equipped with power conductors in accordance with this invention to provide a completely satisfactory electrical distribution network for vehicles of the type described in the aforementioned application. As will become apparent hereinafter, not all of the lanes of these roads must be equipped with a power conductor in accordance with this invention thereby making the total number of lane miles to be equipped rather moderate.

SUMMARY OF THE INVENTION

It is an object of this invention to provide a roadway having means therein for inductively coupling power to vehicles traveling thereon.

Another object of the invention is to provide a roadway having a first lane for vehicular traffic moving in a first direction, a second lane for traffic moving in the opposite direction and a power conductor having one leg in the first lane and another leg in the second lane for driving vehicles in opposite directions in the two lanes upon energization of the power conductor.

In summary, the invention comprises a roadway having a first lane for traffic moving in a first direction, a second lane for traffic moving in the opposite direction, and means for inductively coupling power to vehicles on the roadway including a power supply, a power conductor having a first section embedded in the first lane for coupling energy to vehicles moving in the first direction, a second section passing across the first lane to the second lane and a third section embedded in the second lane for coupling energy to the vehicles moving in the opposite direction, and means connecting the ends of the first and third sections in circuit with the power supply for passing electrical energy through the power conductor.

DETAILED DESCRIPTION OF THE PREFERRED EMBODIMENTS

Figure 1:
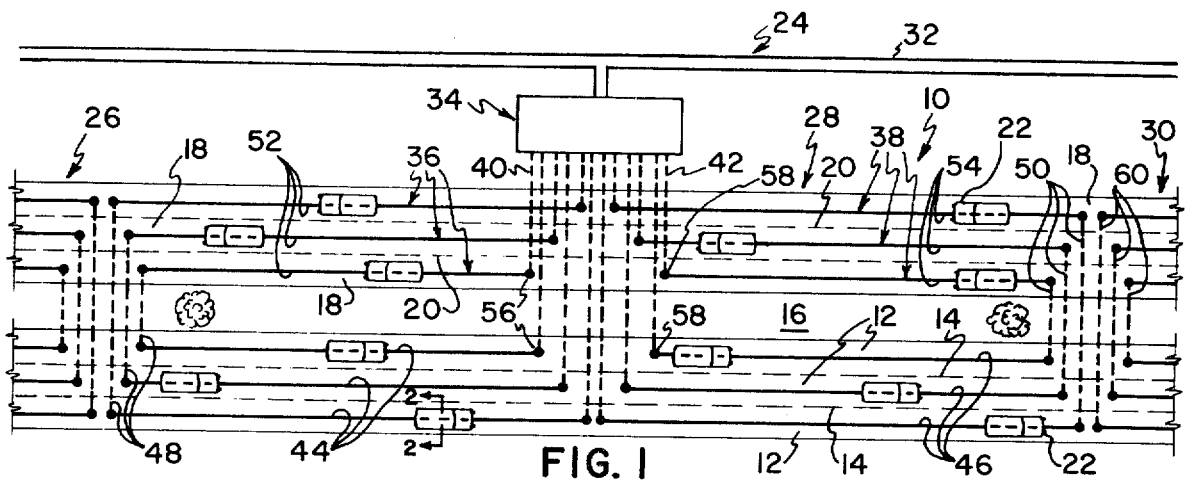
FIG. 1 is a plan view of a roadway equipped with the device of this invention.

Referring to FIG. 1, there is illustrated a roadway 10 having a plurality of first lanes 12 defined by conventional striping 14. A median strip 16 separates the first lanes 12 from a plurality of second lanes 18 which are also defined by conventional striping 20. It will be apparent that the first lanes 12 accommodate movement of a plurality of vehicles 22 in one direction while the second lanes 18 provide for the movement of like vehicles 22 in the opposite direction.

When the vehicles are on the roadway 10, they are at least partially driven by energy derived from the roadway 10. In this regard there is provided means 24 for inductively coupling power to the vehicles 22 on the roadway 10. As is readily apparent from FIG. 1, the inductive coupling means 24 comprises spaced power supplying sections 26, 28, 30 that are arranged one after another down the roadway 10. The inductive coupling means 24 takes power from a transmission line 32 which parallels the roadway 10 or which crosses the roadway 10 which is, of course, a common situation.

The power supplying sections 26, 28, 30 may be substantially indentical. The power supplying section 28 comprises power supply means 34 for converting the electrical energy appearing in the transmission line 32 to energy having the desired characteristics. For example, a typical transmission line carries 69kv three phase 60 cycle alternating current. As is usually the case, this is not that combination of electrical characteristics that is most desirable in the expenditure of electrical energy. Although the energy consumed by the power supplying sections 28 may vary widely, one practical set of characteristics is single phase 120 cycle alternating current of much lower voltage. To produce electrical energy of these characteristics, the converting means 34 must include a step down transformer and a frequency doubling device operating on one of the hot wires to ground. The converting means 34 preferably comprises means for delivering a constant current with the voltage delivered thereby rising as the vehicle loading on the system increases.

A plurality of first power sources 36, one for each pair of lanes 12, 18, extend away from the power supply or converting means 34 in one direction along the roadway 10 while a similar number of second power sources 38 extend from the converting means 34 in the opposite direction along the roadway 10. The power sources 36, 38 are connected to the converting means 34 by suitable connection means 40, 42. Each of the power conductors 36, 38 respectively comprises a first section 44, 46 embedded in the first lanes 12 along the centerlines thereof for coupling energy to the vehicles 22 moving in the traffic direction afforded by the lanes 12. The power sources 36, 38 respectively comprise a second section 48, 50 extending from the first lanes 12 to a corresponding one of the second lanes 18. The power sources 36, 38 also respectively comprise a third section 52, 54 embedded in each of the second lanes 18 for coupling energy to the vehicles 22 in the direction of traffic afforded thereby. In the alternative, the power source 36 may be considered as comprising the sections 44, 52 with the section 48 comprising part of the connection means 40 to provide a closed electrical path.

It will accordingly be seen that there is provided a closed electrical path including the converting means 34, the connection means 40, 42 and the power sources 36, 38. The gap between the power sources 36, 38 as measured between the termini 56, 58 of the first and third sections, is exaggerated in FIG. 1 for purposes of clarity. Similarly, the gap between the power sources 38 and the corresponding power sources of the power supplying section 36, as measured between the corresponding second sections 50, 60, is exaggerated. These gaps are preferably as small as feasible to provide a substantially continuous supply of power to the vehicles 22 during movement along the lanes 12, 18. These gas are preferably less than one car length long.

The length of the first sections 44, 46 and the third sections 52, 54 may vary widely although one mile is a practical value. Accordingly, one converting means 34 is required for each two miles of roadway 10 equipped with this invention. Since the power sources 36, 38 extend in opposite directions from the converting means 34, the existance between the converting means 34 of the power supplying section 28 and the corresponding converting means of the power supplying section 26 is at a maximum. Assuming for purposes of illustration that the maximum length of the power source 36 for a given size of conductor is two miles and the power source 36 extended in both directions from the converting means 34, the maximum distance between the converting means of adjacent power supplying section would be one mile.

From an inspection of FIG. 1, it will be seen that the operative length of the power source, i.e., that portion residing in a traffic bearing lane is a substantial fraction of the total length thereof. The use of this invention accordingly avoids duplicating pairs of transmission lines in each lane of traffic duplicating pairs of transmission lines in each lane of traffic and thereby substantially reduces the installation cost when compared to a comparable system having a pair of transmission lines for each traffic lane.

The

The converting means 34 preferably includes means for de-energizing selected ones of the power sources 36, 38 so that one or more of the lanes 12, 18 may be de-energized at periods less than peak load to conserve energy losses. It will be apparent that suitable signaling devices may be used to indicate which of the lanes are powered and which are unpowered. As will be more apparent hereinafter, the roadway 10 presents a relatively smooth even surface so that normal vehicular travel is not impeded when the power sources 36, 38 are de-energized.

Figure 2:
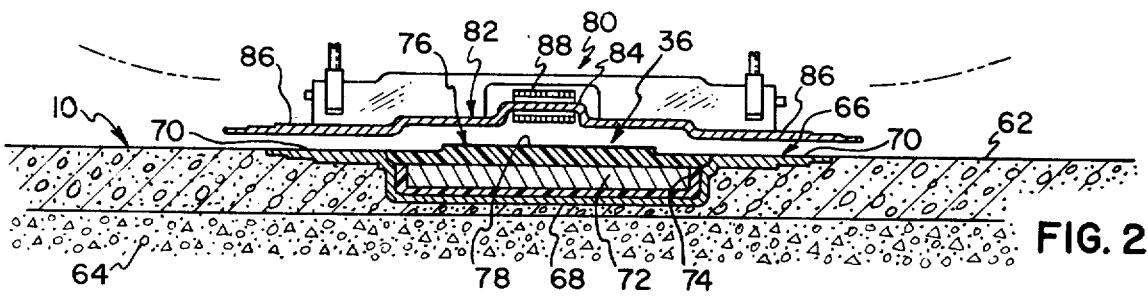
FIG. 2 is a partial enlarged cross-sectional view of the roadway illustrated in FIG. 1, taken substantially along line 2—2 thereof as viewed in the direction indicated by the arrows.
Figure 3:
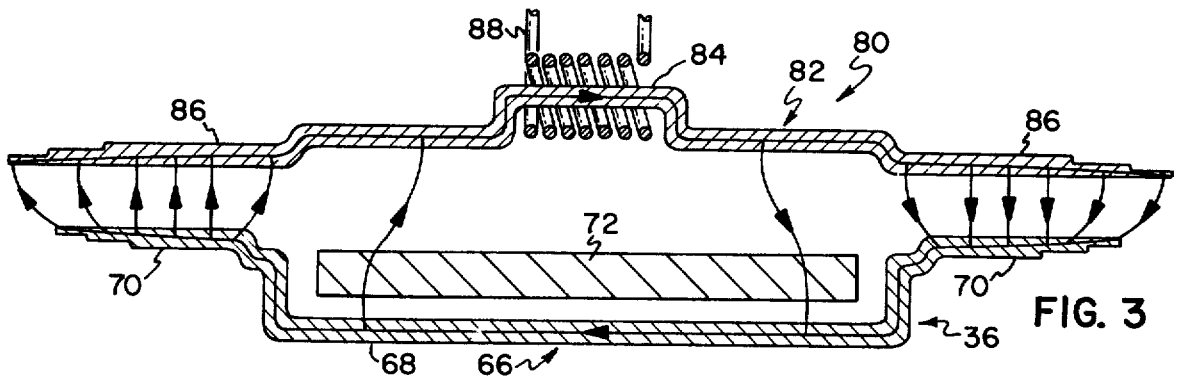
FIG. 3 is a schematic view of the magnetic circuit coupling energy from the roadway to the vehicle.

Referring now to FIG. 2, a detail view of one traffic lane of the roadway 10 is illustrated. A shim layer of concrete or other traffic bearing material 62 may be installed over a pre-existing roadway surface 64 or the concrete layer 62 may comprise the surface of a newly constructed roadway. The power source 36 comprises a source core 66 made of transformer steel or the like. The source core 66 comprises a central section 68 and a pair of lateral sections 70, acting as magnetic poles, elevated with respect thereto providing a recess for receiving a source conductor 72. The source conductor 72 may be of segmented aluminum, for example, and is spaced from the source core 66 by an insulating section 74. An insulating layer 76 extends horizontally across the source conductor 72 to close the upwardly facing recess provided by the source core 66. The insulating layer 76 comprises an elevated central portion 78 which acts to prevent straight ferro-magnetic scrap from touching both of the magnetic poles 70 and causing a magnetic short circuit. A short circuit created in this fashion may undesirably consume a substantial amount of energy as heat without performing any useful work. The insulating section 74 and insulating layer 76 may be made of any suitable material, for example phenol impregnated fiberboard.

An inductive pickup 80 is provided by one or more of the vehicles 22 and reference is made to the aforementioned copending application for a complete disclosure thereof. For present purposes, it will suffice to say that the inductive pickup 80 comprises a pickup core 82 having an elevated central section 84 and a pair of lateral sections 86, acting as magnetic poles, which extend sufficiently to each side to be slightly wider than the overall width of the source core 66. A pickup coil 88 having ten turns, for example, is wound about the central core section 84. The length of the pickup core 82 is desirably a substantial part of the length of the vehicle 22, e.g. the pickup core 82 may be 10 feet long and a vehicle 18 feet in overall length. The width of the pickup sections 86 are preferably a significant fraction of the width of the vehicle 22 so that the area of the pickup poles 86 is substantial. As pointed out in the aforementioned application, the large area of the pickup poles provides a relatively low flux density between the inductive pickup 80 and the power source 36 which has several desirable advantages.

The pickup coil 88 is preferably connected in circuit with a battery, a rectifier and an electric motor to drive the wheels of the vehicle 22. When the voltage produced by the coil 88, by virtue of an increasing amount of coupled flux, exceeds that of the battery, current flows through the battery and/or the load to drive the vehicle 22 and to charge the battery. The current which flows is determined by the net amount of the coupled flux since the voltage in the secondary is established by the battery. It will be apparent that current in the secondary coil 88 causes ampere-turns which oppose the fixed ampere-turns of the power conductor 36. Accordingly, the energy coupled between the power conductor 36 and the pickup 80 is self limiting and can be regulated by adjusting the air gap between the conductor 36 and the pickup 80. Since maximum power is transferred when the ampere-turns of the pickup 80 are approximately one half of the ampere-turns of the power conductor 36 design calculations may be readily accomplished by those skilled in the art to ascertain the size of the cores 66, 82, the number of ampere-turns in the coil 88 and conductor 72 and other parameters effecting the inductive coupling of energy to the vehicle 22.

Since the effect of the magnetic field on conventional vehicles is negligible, the roadway 10 allows convention vehicle travel even when the lanes 12, 18 are powered.

It will accordingly be apparent to those skilled in the art that sufficient energy may be coupled between the roadway and the vehicles thereon to propel the vehicles along the roadway and to charge the vehicle batteries for self-powered movement on a conventional roadway.

Figure 4:
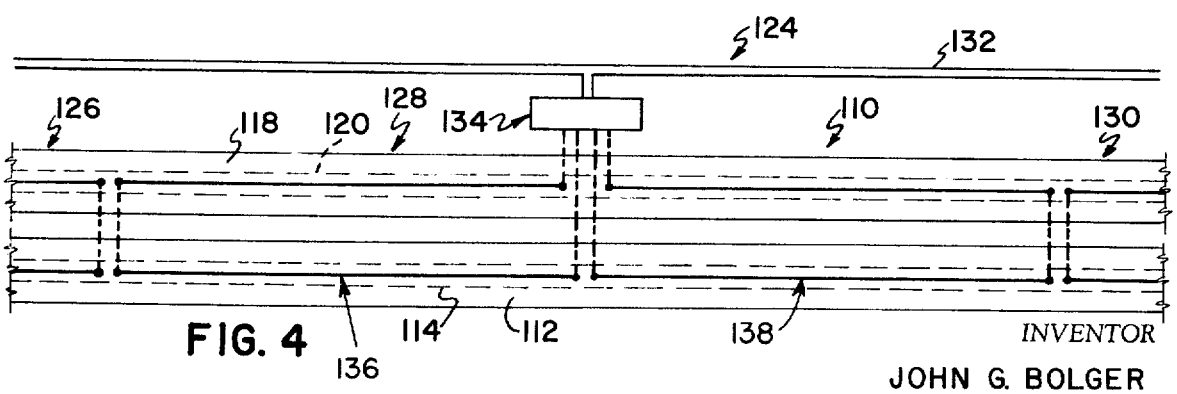
FIG. 4 is a plan view of another roadway illustrating a different embodiment of this invention.

As will be apparent, not all of the lanes of traffic need necessarily be equipped with this invention. Toward this end, there is illustrated in FIG. 4 a roadway 110 having only one powered lane in each direction. For purposes of brevity, analogous reference characters are used on analogous parts with only the differences between the roadways 10, 110 being specifically discussed. The roadway 110 is illustrated as having a plurality of traffic lanes 112, defined by conventional striping 114, affording traffic movement in one direction while a like plurality of lanes 118, defined by conventional striping 120, provide for traffic movement in the opposite direction. The power supplying Section 128 comprises a first single power source 136 extending away from the converting means 134 in one direction and a second single power source 138 extending from the converting means 134 in the opposite direction. It will be seen from the drawing, the power sources 136, 138 are disposed to provide a single powered lane in each direction of travel. Suitable signaling devices may, of course, be provided to inform motorists of the powered lane. It will be readily apparent that any number of the lanes 112, 118 may be powered by duplicating the power sources in the remaining lanes.

It will accordingly be seen that there is herein provided a roadway for coupling vehicles and has many advantages, some of which have been pointed out.

I claim:

1. A roadway having a surface layer of traffic bearing material, a first lane for traffic moving in a first direction, a second lane for traffic moving in the opposite direction, and means for inductively coupling power to vehicles on the roadway comprising
   a power supply,
   a power source having one section for coupling energy to vehicles moving in the first direction and another section for coupling energy to vehicles moving in the opposite direction, each power source section comprises a source core having a central section in the traffic bearing material and a pair of lateral sections adjacent the surface of the traffic bearing material providing a recess therein, and a source conductor disposed in the recess, and
   means connecting the ends of the source conductor in circuit with the power supply for passing electrical energy through the power source.

2. The roadway of claim 1 wherein there are a plurality of first lanes and a plurality of second lanes.

3. The roadway of claim 2 wherein the sections are disposed in corresponding ones of the first and second lanes.

4. The roadway of claim 2 wherein the roadway comprises a power source for each pair of first and second lanes.

5. The roadway of claim 1 wherein the power source comprises an insulating layer spanning the lateral core sections adjacent the surface of the traffic bearing material.

6. The roadway of claim 5 wherein the insulating layer comprises an elevated portion intermediate the sides thereof extending above the lateral core sections.

7. The roadway of claim 1 wherein the sections of the power source are disposed on the centerline of the first and second lanes.

8. The roadway of claim 1 wherein the connecting means comprise a section extending from the first lane to the second lane, adjacent the terminus of the power source sections, for electrically connecting the power source sections and means connecting the other terminus of the power source sections to the power supply.

* * * * *